United States Patent
Sudhakar (10) Patent No.: US 10,852,422 B2
(45) Date of Patent: Dec. 1, 2020

(54) METHOD FOR CALIBRATING A SENSOR OF A MOTOR VEHICLE FOR MEASURING ANGLES, COMPUTING DEVICE, DRIVER ASSISTANCE SYSTEM AND MOTOR VEHICLE

(71) Applicant: VALEO Schalter und Sensoren GmbH, Bietigheim-Bissingen (DE)

(72) Inventor: Dheeraj Sudhakar, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 220 days.

(21) Appl. No.: 15/775,235

(22) PCT Filed: Oct. 21, 2016

(86) PCT No.: PCT/EP2016/075373
§ 371 (c)(1),
(2) Date: May 10, 2018

(87) PCT Pub. No.: WO2017/080791
PCT Pub. Date: May 18, 2017

(65) Prior Publication Data
US 2018/0321378 A1     Nov. 8, 2018

(30) Foreign Application Priority Data

Nov. 13, 2015 (DE) .................. 10 2015 119 660

(51) Int. Cl.
*G01S 13/931* (2020.01)
*G01S 7/40* (2006.01)
(Continued)

(52) U.S. Cl.
CPC .......... *G01S 13/931* (2013.01); *G01S 7/4026* (2013.01); *G01S 13/343* (2013.01);
(Continued)

(58) Field of Classification Search
CPC .. G01S 13/931; G01S 13/4454; G01S 13/343; G01S 7/4026; G01S 2013/93274;
(Continued)

(56) References Cited

U.S. PATENT DOCUMENTS 9,989,633 B1*   6/2018   Pandey .................. G01S 3/32
2010/0295722 A1*   11/2010   Shingyoji ............ G01S 13/931
                                                         342/70
(Continued)

FOREIGN PATENT DOCUMENTS

DE    10 2004 046 873 A1   4/2006
DE    10 2009 024 064 A1   12/2010
(Continued)

OTHER PUBLICATIONS

International Search Report issued in PCT/EP2016/075373 dated Dec. 21, 2016 (3 pages).
(Continued)

*Primary Examiner* — Frank J McGue
(74) *Attorney, Agent, or Firm* — Osha Bergman Watanabe & Burton LLP (57) ABSTRACT

A method for calibrating a sensor of a motor vehicle includes, while the motor vehicle is moved relative to an object, continuously receiving a reception signal by a computing device from two reception devices of the sensor, the reception signal describing a sensor signal that is emitted by the sensor and reflected at the object. A measurement angle between the sensor and the object is determined based on a phase difference between the reception signals. A relative orientation between the sensor and the object is determined continuously based on the reception signals, and a reference time at which the relative orientation corresponds to a predetermined reference orientation for which a reference angle between the sensor and the object is known is deter- (Continued)

mined by the computing device. The measurement angle is determined for the reference time, and the sensor is calibrated based on a comparison between the measurement angle for the reference time and the reference angle.

10 Claims, 4 Drawing Sheets

(51) Int. Cl.
    *G01S 13/34* (2006.01)
    *G01S 13/44* (2006.01)
(52) U.S. Cl.
    CPC ..... *G01S 13/4454* (2013.01); *G01S 2007/403* (2013.01); *G01S 2007/4091* (2013.01); *G01S 2013/9323* (2020.01); *G01S 2013/93272* (2020.01); *G01S 2013/93274* (2020.01)
(58) Field of Classification Search
    CPC ... G01S 2013/93272; G01S 2013/9323; G01S 2007/403; G01S 2007/4091
    USPC .......................................................... 342/70
    See application file for complete search history.

(56) References Cited

U.S. PATENT DOCUMENTS

| | | | |
|---|---|---|---|
| 2015/0198697 A1* | 7/2015 | Kishigami | ............ G01S 13/325 342/145 |
| 2015/0247924 A1* | 9/2015 | Kishigami | ............ G01S 13/931 342/70 |

FOREIGN PATENT DOCUMENTS

| | | |
|---|---|---|
| DE | 10 2012 224 499 A1 | 4/2014 |
| DE | 10 2013 203 574 A1 | 9/2014 |
| DE | 10 2013 209 530 A1 | 11/2014 |
| EP | 1612577 B1 | 2/2007 |
| EP | 1467223 B1 | 9/2007 |
| JP | 2010-271083 A | 12/2010 |
| WO | 2014/041062 A1 | 3/2014 |

OTHER PUBLICATIONS

Written Opinion of the International Searching Authority issued in PCT/EP2016/075373 dated Dec. 21, 2016 (9 pages).
German Search Report issued in DE 10 2015 119 660.3 dated May 20, 2016 (12 pages).
The Notice of Preliminary Rejection issued in corresponding Korean Application No. 10-2018-7013455, dated Feb. 11, 2020 (14 pages).

* cited by examiner

METHOD FOR CALIBRATING A SENSOR OF A MOTOR VEHICLE FOR MEASURING ANGLES, COMPUTING DEVICE, DRIVER ASSISTANCE SYSTEM AND MOTOR VEHICLE

CROSS-REFERENCE TO RELATED APPLICATIONS

This application is a National Stage Entry from International Patent Application PCT/EP2016/075373, filed 21 Oct. 2016, which claims priority to German Patent Application 102015119660.3, filed 13 Nov. 2015.

FIELD

The present invention relates to a method for calibrating a sensor of a motor vehicle, in which, while the motor vehicle is moved relative to an object, a reception signal is received continuously in each case by means of a computing device from two reception devices of the sensor, said reception signal describing a sensor signal that is emitted by the sensor and reflected at the object, a measurement angle between the sensor and the object is determined on the basis of a phase difference between the reception signals and a relative orientation between the sensor and the object is determined continuously on the basis of the reception signals. Moreover, the present invention relates to a computing device for a driver assistance system of a motor vehicle. Moreover, the present invention relates to a driver assistance system having at least one sensor and such a computing device. Finally, the present invention relates to a motor vehicle having such a driver assistance system.

BACKGROUND

The prior art has disclosed driver assistance systems for motor vehicles, by means of which it is possible to capture a surrounding region of the motor vehicle. To this end, the driver assistance system usually comprises a multiplicity of sensors that, for example, can be arranged in distributed fashion on the motor vehicle. By way of example, these sensors or distance sensors can emit a sensor signal that is then reflected at an object or an obstacle in the surrounding region of the motor vehicle and that reaches the sensor again. Then, the distance between the motor vehicle and the object can be determined on the basis of the time-of-flight between the emission of the sensor signal and the reception of the sensor signal reflected by the object or the echo of the sensor signal. By way of example, such sensors can be ultrasonic sensors, laser scanners, lidar sensors or radar sensors.

In the present case, interest is directed, in particular, to radar sensors for motor vehicles. By way of example, these radar sensors are operated at a frequency of approximately 24 GHz or approximately 79 GHz. In general, the radar sensors serve to detect an object in a surrounding region of the motor vehicle. The radar sensors can be part of different driver assistance systems that assist the driver in guiding the motor vehicle. Radar sensors firstly measure the distance between the object and the motor vehicle. Secondly, the radar sensors also measure the relative speed in relation to the object. Further, the radar sensors also measure a measurement angle or a so-called target angle, i.e. the angle between an imaginary connecting line to the object and a reference line, for instance the vehicle longitudinal axis.

Radar sensors are usually placed behind the bumper, for example in the respective corner regions of the bumper. For the purposes of detecting the target object, the radar sensor emits a sensor signal in the form of an electromagnetic wave. This sensor signal is then reflected at the object to be detected and received again by the radar sensor as an echo. In the present case, interest is directed, in particular, to so-called frequency modulated continuous wave radar sensors, which are also referred to as an FMCW radar. Here, the sensor signal usually comprises a sequence of frequency modulated chirp signals, which are emitted in succession. For the purposes of obtaining a reception signal, the reflected transmission signal is initially down-mixed into the baseband and subsequently sampled by means of an analogue-to-digital converter. Consequently, it is possible to provide a number of sampled values. These sampled values of the reception signal then are processed by means of an electronic computing device. This computing device, which comprises a digital signal processor, for example, is integrated in the radar sensor, in particular.

Usually, a relatively broad azimuthal angle range, which may be 150°, for example, is captured by the radar sensor in the horizontal direction. Thus, the radar sensor has a relatively large azimuthal capture angle, and so the visual field or the capture region of the radar signal is correspondingly broad in the azimuth direction. This azimuthal capture region can be subdivided into smaller portions which are irradiated in succession by means of the radar sensor. To this end, the main lobe of the transmission antenna is electronically pivoted in the azimuth direction for example, e.g. according to the phase array principle.

In this context, DE 10 2004 046 873 A1 describes a radar sensor and an associated method for distance and speed regulation of a motor vehicle. Here, a temporal change of a point of reflection of the radar radiation at the object is ascertained and a classification of the detected object is ascertained depending on the temporal change of the point of reflection. Advantageously, this object classification is also used, once again, for predicting the object position more accurately. To this end, the change in the point of reflection, in particular, is captured over a predetermined period of time. As a result of this, it is possible to be able to deduce the size of the object by way of object migrations that vary in time.

Further, DE 10 2012 224 499 A1 has disclosed a method for identifying a space of a side strip using an ultrasonic wave sensor, a radar and an imaging apparatus. Using the method, it is possible to identify, in particular, stationary objects, e.g. crash barriers, and moving objects using a Doppler effect of the radar. By way of example, it is possible to monitor whether a distance between a stationary object and the vehicle remains constant for a pre-set time or longer. In this case, the stationary object can then be determined as a crash barrier.

Moreover, DE 10 2013 209 530 A1 describes a method for determining an evaluation maladjustment angle of a radar sensor of a vehicle. To this end, evaluation angles of radar localizations are determined in relation to a coordinate system of the radar sensor, wherein an evaluation angle of a radar localization is determined in each case on the basis of radar echoes that are obtained with at least two antenna characteristics that differ in the evaluation direction. Moreover, the evaluation maladjustment angle is determined on the basis of a frequency distribution of the evaluation angles of at least some of the radar localizations.

SUMMARY

It is an object of the present invention to highlight a solution as to how a sensor for a motor vehicle, in particular a radar sensor, can be calibrated in a simpler and more reliable manner.

According to the invention, this object is achieved by a method, by a computing device, by a driver assistance system and by a motor vehicle having the features according to the respective independent claims. Advantageous embodiments of the invention are the subject matter of the dependent claims, the description and the figures.

A method according to the invention serves to calibrate a sensor of a motor vehicle. Here, while the motor vehicle is moved relative to an object, a reception signal is received continuously in each case by means of a computing device from two reception devices of the sensor, said reception signal describing a sensor signal that is emitted by the sensor and reflected at the object. Moreover, a measurement angle between the sensor and the object is determined on the basis of a phase difference between the reception signals. Further, a relative orientation between the motor vehicle and the object is determined continuously on the basis of the reception signals. Moreover, provision is made for a reference time, at which the relative orientation corresponds to a predetermined reference orientation for which a reference angle between the sensor and the object is known, to be determined by means of the computing device. Further, the measurement angle is determined for the reference time and the sensor is calibrated on the basis of a comparison between the measurement angle at the reference time and the reference angle.

The present method relates to the calibration of a sensor, which can be carried out during the movement of the motor vehicle, in particular. The sensor is a sensor that can be used to capture objects in a surrounding region of the motor vehicle. Using the sensor, it is possible to determine a distance between the motor vehicle and the object. Moreover, a measurement angle between the motor vehicle and the object can be determined using the sensor. By way of example, the sensor can be a radar sensor, a lidar sensor or a laser scanner. A plurality of temporally successive measurement cycles can be carried out by the sensor while the motor vehicle is moved relative to the object. A sensor signal can be emitted in each of the measurement cycles using an appropriate transmission element of the sensor. This sensor signal is then reflected at the object and said sensor signal arrives back at the sensor again. In the present case, the sensor comprises at least two reception devices, by means of which a reception signal can be provided in each case. Here, provision is made, in particular, for the at least two reception devices to have a known distance from one another. The measurement angle between the motor vehicle, or the sensor, and the object then can be determined on the basis of the phase difference between the reception signals that are provided by the reception devices. The measurement angle between the sensor and the object can be determined according to the mono-pulse method. As an alternative thereto, provision can be made of so-called digital beamforming being used in order to determine the measurement angle. Here, it is possible to predetermine a coordinate system in relation to the sensor or the motor vehicle, relative to which the measurement angle between the sensor and the object is determined.

Moreover, provision is made of determining a relative orientation between the sensor and the object on the basis of the reception signals. To this end, the distance between the sensor and the object can be determined in each case in the plurality of temporally successive measurement cycles. Here, the distance between the sensor and the object can be determined on the basis of the time-of-flight of the sensor signal emitted by the sensor. The reception signals, which are provided by the reception devices of the sensor, are transmitted to a computing device for further processing purposes. By way of example, this computing device can be formed by an electronic controller of the motor vehicle. Then, the reception signals can be evaluated appropriately by means of the computing device. By means of the computing device, it is possible to determine both the measurement angle between the sensor and the object and the relative orientation between the sensor and the object.

According to the invention, provision is now made for a reference time to be determined by means of the computing device, the relative orientation between the sensor and the object corresponding to a predetermined reference orientation at said reference time. To this end, the computing device can appropriately evaluate the reception signals, which were determined in the temporally successive measurement cycles. In particular, the distance or the relative orientation between the sensor and the object can be determined for each of the measurement cycles by means of the computing device. Consequently, it is possible to monitor the occurrence of the reference time, at which the sensor and the object have a predetermined reference orientation in relation to one another. A reference angle between the sensor and the object is known for this predetermined reference orientation. Furthermore, provision is made for the measurement angle to be determined for this reference time. As explained above, the measurement angle is determined on the basis of the phase difference of the reception signals. Consequently, it is possible to compare the measurement angle, which was determined at the reference time, and the known reference angle to one another. Then, the sensor can be calibrated depending on the comparison of the measurement angle and the reference angle. This is based on the discovery that errors may arise during the measurement and, in particular, the angle measurement between the sensor and the object, said errors possibly being caused by assembly tolerances. Further, these can be caused by the properties of the vehicle. By way of example, provision can be made for the sensor to be arranged covered behind a bumper of the motor vehicle. This applies, in particular, to the case where the sensor is embodied as a radar sensor. In this case, the shaping of the bumper, the lacquer and the material of the bumper may have an influence on the angle measurement. In the present case, these tolerances can be corrected in the installed state of the sensor and while the motor vehicle is in motion. Provision can also be made for the motor vehicle to be moved past the object and the temporally successive measurement cycles to be carried out in the process. The reception signals determined in the measurement cycles can be subsequently evaluated. Using the method, it is possible to determine a systematic angle error, which is caused by systematic inaccuracies of the sensor itself and/or by tolerances during the installation of the sensor, for example. Consequently, the sensor can be reliably calibrated after installation in the motor vehicle.

Preferably, the reference orientation is predetermined in such a way that an imaginary connecting line between the sensor and the object is arranged perpendicular to a vehicle longitudinal axis of the motor vehicle. As already mentioned, the sensor can be a radar sensor. By way of example, the latter can be arranged at a lateral tail region of the motor vehicle. Moreover, an intended installation orientation or an intended installation position of the sensor can be saved in the computing device. In particular, the intended installation orientation can describe the alignment of the sensor relation to a reference point of the motor vehicle. Moreover, the capture region of the sensor can be saved in the computing device. In particular, the capture region describes the region in which objects can be recognized using the sensor. In particular, the capture region can be predetermined in relation to an azimuthal angle range. In the present case, the reference orientation is predetermined in such a way that a direct connection between the sensor and the object is arranged substantially perpendicular to the vehicle longitudinal axis. Expressed differently, the reference orientation is determined in such a way that it corresponds to the orientation in which the object is situated next to the sensor. Such a reference orientation can be determined in a simple and reliable manner by means of the computing device on the basis of the reception signals that provide information about the distance between the sensor and the object.

In one embodiment, a plurality of distance values, which each describe the distance between the sensor and the object, are determined as a function of time for the purposes of determining the reference time on the basis of the reception signals. As already explained above, temporally successive measurement cycles can be carried out using the sensor. Then, a distance value, which describes the distance between the sensor and the object, can be determined for each of the measurement cycles using the computing device. Said distance value can be determined on the basis of the time-of-flight between the emission of the sensor signal and the reception of the sensor signal reflected at the object. Consequently, the relative orientation between the sensor and the object can be determined as a function of time. Consequently, it is possible to ascertain whether the motor vehicle is moving towards the object or whether the motor vehicle is moving away from the object. Moreover, it is possible to determine whether the motor vehicle has reached the predetermined reference orientation at the current time. The time at which the motor vehicle has reached the reference orientation can then be output as the reference time, at which the measurement angle is also determined.

In a further embodiment, a first distance value that corresponds to a minimum distance value of the plurality of distance values is determined for the purposes of determining the reference time. Then, the time at which this minimum distance value is achieved is considered to be the reference time. By way of example, if the object is static, i.e. not moving, and the motor vehicle is moved relative to the object, the distance between the sensor and the object initially decreases in this case. After the shortest distance between the sensor and the object, or the minimum distance value, was reached, the distance between the sensor and the object increases again. This is reflected in the time curve of the distance values as a function of time. The time curve of the distance values as a function of time initially has a falling curve, subsequently a minimum and then an increasing curve. Consequently, when the reference orientation is reached can easily be determined on the basis of the distance values.

Further, it is advantageous if a faulty installation orientation of the sensor is determined on the basis of the comparison between the measurement angle for the reference time and the reference angle and the sensor is calibrated on the basis of the determined, faulty installation orientation. Thus, the measurement angle, which is determined at the reference time, and the known reference angle can be compared to one another in the present case. In particular, it is possible to determine the faulty installation orientation in respect of an azimuthal angle range. If the sensor has a faulty installation orientation, this has an effect on all angle measurements in the entire capture region. This can be taken into account when calibrating the sensor. To this end, an offset value or a correction value can be determined for the respectively ascertained measurement value, for example. In this way, it is possible to determine the measurement angle between the sensor and the object particularly precisely.

In a further embodiment, an intended angle between the sensor and the object is determined on the basis of the reference angle for at least one further time, the intended angle is compared to the measurement angle for the at least one further time and the sensor is calibrated on the basis of the comparison between the intended angle and the measurement angle for the at least one further time. By way of example, the further time can lie after the reference time in time. An intended angle between the sensor and the object is determined for this further time. Here, it is possible to determine the intended angle as a function of the reference angle, in particular. Moreover, the measurement angle is determined for the further time on the basis of the reception signals or on the basis of the phase difference between the reception signals. Then, this measurement angle is compared to the intended angle. The sensor can be calibrated appropriately if there is a difference between the measurement angle for the time and the intended angle. In particular, provision is made for an intended value to be determined in each case for a plurality of times and for the respective measurement angle to be determined for the times. Consequently, it is possible to carry out a particularly precise calibration of the sensor. In particular, the times can be selected in such a way that the calibration is carried out for different angles within the capture region. Consequently, it is possible to ensure that the sensor supplies an accurate measurement over the entire capture region, in particular over the entire azimuthal capture region.

In one embodiment, the first distance value, which describes the distance between the sensor and the object at the reference time, and a second distance value, which describes the distance between the sensor and the object at the further time, will be determined for the purposes of determining the intended angle. Here, it is possible moreover to determine whether the object is static or whether it moves during the movement of the motor vehicle between the reference time and the further time. If the object is static and the motor vehicle is moved substantially parallel to the object between the reference time and the further time, the intended angle can be determined on the basis of a right-angled triangle. Here, the first distance value corresponds to the adjacent side and the second distance value corresponds to the hypotenuse of the triangle. Consequently, the intended angle can be determined in a simple fashion on the basis of the geometric relationships.

Preferably, a route value, which describes a path travelled by the motor vehicle between the reference time and the further time, is determined for the purposes of determining the intended angle. Furthermore, it is advantageous if the path covered by the motor vehicle is determined by means of odometry. Then, on the basis of the geometric relationship, the intended angle can be determined on the basis of the first distance value and the second distance value. Expressed differently, the route value is determined on the basis of odometry data. To this end, the number of rotations of at least one wheel can be captured by an appropriate sensor during the movement of the motor vehicle between the reference time and the further time. Moreover, it is possible to determine a current steering angle and/or a rotation rate of the motor vehicle in order to determine the direction of travel. These data can be made available to the computing device. Consequently, the latter, on the basis of the sensor data, can determine the movement of the motor vehicle and hence the route value by means of odometry.

In a further embodiment, the measurement angle is determined from the reception signals on the basis of a predetermined phase curve and the phase curve is corrected for the purposes of calibrating the sensor. The two reception devices of the sensor have a predetermined distance from one another. Respective components of the sensor signal reflected at the object reach both reception devices. As a consequence of the distance between the reception devices, the components of the reflected sensor signal, and hence also the reception signals that describe the respective components of the sensor signal, have a phase offset in relation to one another. Then, the measurement angle can be determined on the basis of an appropriate phase curve, which describes what phase difference is assigned to which measurement angle. An appropriate look-up table also can be used instead of a phase curve. Then, this phase curve can be corrected accordingly during the calibration. Here, provision can also be made for an ideal phase curve to be initially saved in the computing device. Then, this phase curve can be corrected accordingly during the operation of the motor vehicle. Consequently, the calibration can be carried out precisely for the respective vehicle and the respective sensor. If the motor vehicle has a plurality of sensors, the calibration can be carried out separately for each of the sensors.

In a further embodiment, the object, in respect of which the motor vehicle is moved, is a stationary object or a moving object. The object captured by the sensor can be a stationary object, i.e. a non-moving object. By way of example, the object can be an object that is arranged at the edge of a roadway, along which the vehicle is moved. By way of example, the object can be part of a crash barrier. Instead of a complete object, the measurement with the sensor can also be carried out in respect of a predetermined point of reflection of the object. The object can also be a moving object.

A driver assistance system according to the invention comprises a distance sensor, in particular a radar sensor, and a computing device according to the invention. Here, provision also can be made for the driver assistance system to comprise a plurality of distance sensors or radar sensors, which are arranged at the motor vehicle in a distributed manner. By way of example, the driver assistance system can be embodied for monitoring the blind spot, for providing a collision warning or the like. The driver assistance system also can be embodied as a lane change assistant.

A motor vehicle according to the invention comprises a driver assistance system according to the invention. In particular, the motor vehicle is embodied as a motor car.

The preferred embodiments presented with reference to the method according to the invention, and the advantages thereof, apply, mutatis mutandis, to the control device according to the invention, the driver assistance system according to the invention and the motor vehicle according to the invention.

Further features of the invention emerge from the claims, the figures and the description of the figures. The features and feature combinations specified above in the description and the features and feature combinations only specified below in the description of the figures and/or only shown in the figures can be used not only in the respectively specified combination, but also in other combinations or on their own, without departing from the scope of the invention. Consequently, embodiments which are not explicitly shown and explained in the figures but which emerge, and can be produced, from the explained embodiments by separate feature combinations should also be considered to be comprised and disclosed by the invention. Embodiments and feature combinations which consequently do not have all features of an originally phrased independent claim should also be considered to be disclosed.

BRIEF DESCRIPTION OF DRAWINGS

The invention will now be explained in more detail on the basis of preferred exemplary embodiments and with reference to the attached drawings.

In detail.

Identical and functionally identical elements are provided with the same reference sign in the figures.

DETAILED DESCRIPTION

Figure 1:
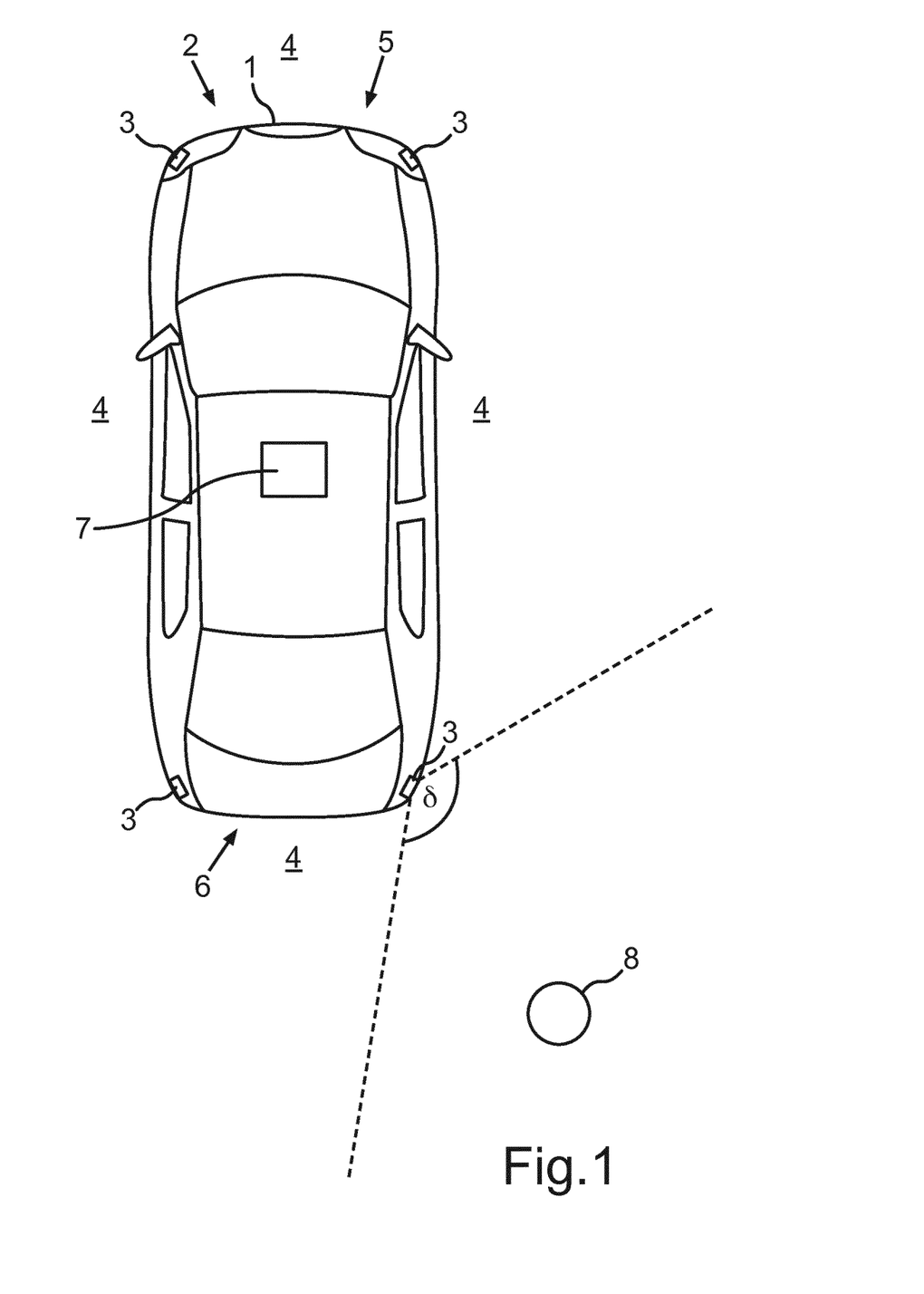
FIG. 1 shows a schematic illustration of a motor vehicle according to one embodiment of the present invention, said motor vehicle comprising a driver assistance system with a plurality of radar sensors.

FIG. 1 shows a motor vehicle 1 according to an embodiment of the present invention in a plan view. The motor vehicle 1 is embodied as a motor car in the present exemplary embodiment. The motor vehicle 1 comprises a driver assistance system 2, which can be embodied as an adaptive cruise control, a blind spot assistant, a lane keeping assistant and/or a lane change assistant, for example.

The driver assistance system 2 comprises at least one sensor 3 that can be used to capture at least one object 8 in a surrounding region 4 of the motor vehicle 1. In the present exemplary embodiment, the driver assistance system 2 comprises four sensors 3, each of which is embodied as a radar sensor. Using the radar sensors, it is possible to emit a sensor signal in the form of electromagnetic radiation, which is reflected at the object 8. The reflected electromagnetic radiation returns to the respective sensor 3 or radar sensor again as an echo signal. A distance between the sensor 3 and the object 8 can be determined on the basis of the time-of-flight. In the present case, two radar sensors are arranged in a front region 5 and two radar sensors are arranged in a tail region 6 of the motor vehicle 1. By way of example, the sensors 3 or the radar sensors can be arranged covered behind a bumper of the motor vehicle 1. Using the respective radar sensors, it is possible to capture an azimuthal angle range $\alpha$ in the horizontal direction, said azimuthal angle range being able to lie in the range between 150° and 180°. This azimuthal angle range $\delta$ is shown in an exemplary manner for the rear right sensor 3. The radar sensors are capable of capturing objects 8 up to a distance of 80 to 100 m.

Moreover, the driver assistance system 2 comprises a computing device 7, which may be formed by a computer, a digital signal processor, a microprocessor or the like, for example. In particular, the computing device 7 can be formed by an electronic controller of the motor vehicle 1. The computing device 7 is connected to the sensors 3 for data transmission purposes. Appropriate data lines are not illustrated in the present case for reasons of clarity. Consequently, the reception signals, which are captured by the sensors 3 and which describe the surrounding region 4, can be transmitted from the sensors 3 to the computing device 7. Then, the computing device 7 can evaluate the sensor data appropriately. Moreover, the computing device 7 can receive data from further sensors, which describe the current speed and/or the current steering angle of the motor vehicle 1.

Figure 2:
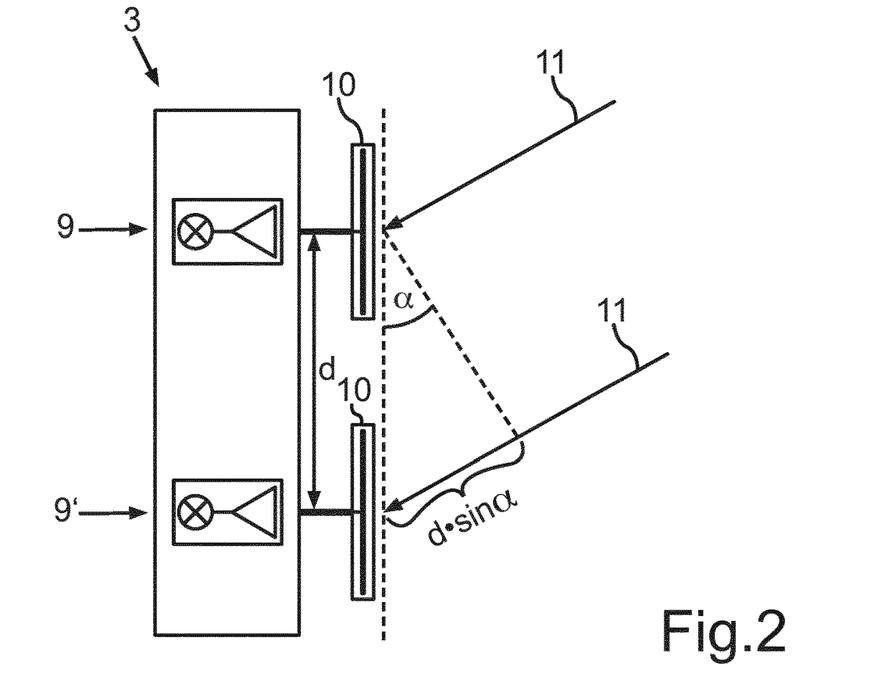
FIG. 2 shows a schematic illustration of a radar sensor having two reception devices.

FIG. 2 shows a schematic illustration of one of the sensors 3 in a cut view. In the present case, it is possible to identify that the sensor 3 has a first reception device 9 and a second reception device 9'. Each of the reception devices 9 comprises an appropriate antenna 10. The centres of the antennas 10 have a known distance d from one another. In particular, the two reception devices 9, 9' form the two reception channels of the sensor 3. Using the antennas 10, it is possible to receive respective components of the sensor signal reflected at the object 8. These are elucidated by the arrows 11 in the present case. One reception signal, which describes the respective component of the reflected sensor signal, can be provided in each case by each of the reception devices 9, 9'. Here, the first reception signal, which is provided by the first reception device 9, and the second reception signal, which is provided by the second reception device 9', have a phase difference $\Delta\varphi$ from one another. On the basis of this phase difference $\Delta\varphi$, the distance d between the reception devices 9, 9' and the wavelength of the reflected sensor signal, it is then possible to determine a measurement angle $\alpha$ between the sensor 3 and the object 8. To this end, a phase curve 12 is saved in the computing device 7. The measurement angle $\alpha$ between the sensor 3 and the object 8 can be determined according to the mono-pulse method. As an alternative thereto, provision can be made for the so-called digital beamforming to be used in order to determine the measurement angle $\alpha$.

Figure 3:
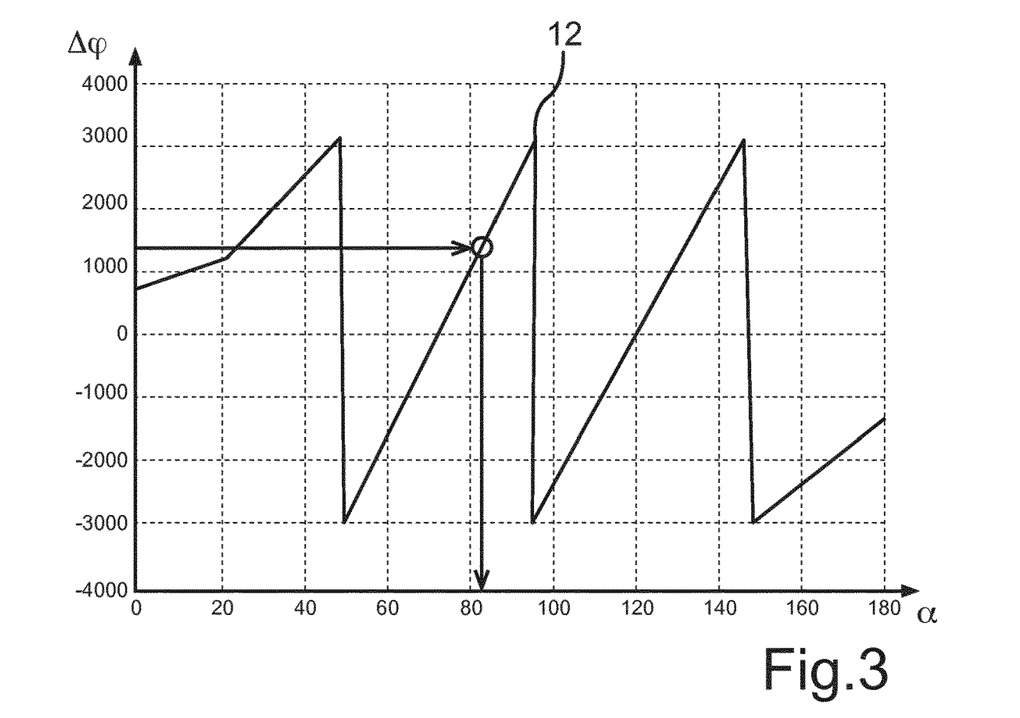
FIG. 3 shows a phase curve for determining a measurement angle between the radar sensor and an object.

Such a phase curve 12 is illustrated in FIG. 3 in an exemplary manner. This phase curve 12 can be saved in the computing device 7. The diagram illustrated there shows the assignment of the determined phase angle $\Delta\varphi$ to the corresponding measurement angle $\alpha$. In the present case, the phase curve 12 is presented in a wound up manner. The phase curve 12 can be determined on the basis of a non-wound-up phase curve, which has a positive gradient. Initially, an ideal phase curve 12, which does not have waviness, for example, can be saved in the computing device 7.

Figure 4:
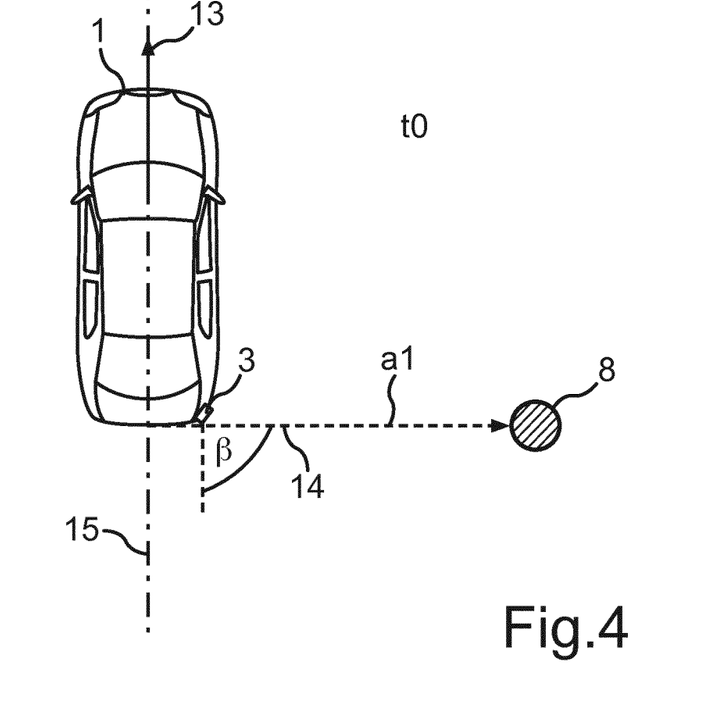
FIG. 4 shows the motor vehicle and the object, which have a predetermined reference orientation in relation to one another.

FIG. 4 shows the motor vehicle 1 according to FIG. 1, which is moved relative to the object 8. In the present case, the object 8 is a stationary object 8, which therefore does not move. In the present case, the motor vehicle 1 is moved along the arrow 13. During the movement of the motor vehicle 1, the object 8 is captured continuously using the sensor 3, in particular the sensor 3 that is arranged in the right tail region 6 of the motor vehicle 1. To this end, a distance value a is ascertained continuously using the computing device 7, said distance value describing the distance between the sensor 3 and the object 8. Instead of the object 8, it is also possible to capture a predetermined point of reflection at an object 8 with the aid of the sensor 3. To this end, a so-called tracking function can be provided for example by means of the computing device 7, the reflection point being able to be followed or tracked as a function of time t by means of said tracking function. In principle, provision also can be made for a digital map of the surroundings to be provided by the computing device 7, said map of the surroundings describing the surrounding region 4 of the motor vehicle 1. Then, the objects 8 that are captured by the sensors 3 can be entered in this digital map of the surroundings.

In the illustration of FIG. 4, the motor vehicle 1 and the object 8 have a predetermined reference orientation in relation to one another. This reference orientation is defined in such a way that an imaginary connecting line 14 between the sensor 3 and the object 8 is arranged perpendicular to a vehicle longitudinal axis 15. In order to determine this reference orientation, the distance value a, which describes the distance between the sensor 3 and the object 8, is continuously determined in each case in the temporally successive measurement cycles by means of the computing device 7. The time at which the motor vehicle 1 and the object 8 have the predetermined reference orientation in relation to one another is referred to as reference time t0.

Figure 5:
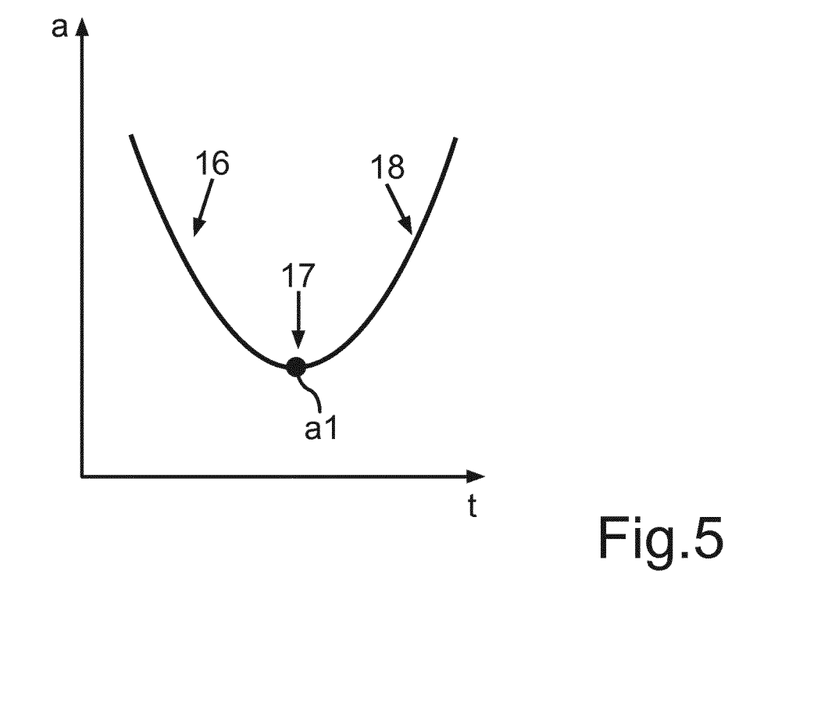
FIG. 5 shows a distance value, which describes the distance between the radar sensor and the object, as a function of time.

FIG. 5 shows a diagram that describes the curve of the distance value a as a function of time t. In the present case, the case is considered in which the motor vehicle 1 is initially moved toward the object 8 and subsequently moved away from the object 8 again. In a first region 16, the curve of the distance value a drops as a function of time t. Moreover, the curve has a minimum in the region 17. This minimum corresponds to a first distance value a1, at which the motor vehicle 1 and the object 8 have the reference orientation in relation to one another. An increasing curve emerges in a further region 18. The curve of the distance values a as a function of time t is substantially parabolic. This emerges by virtue of the sensor 3 initially being moved toward the object 8 and subsequently moved away therefrom again.

If the motor vehicle 1 and the object 8 have the reference orientation in relation to one another, a reference angle $\beta$ between the sensor 3 and the object 8 is known. This reference angle $\beta$ can be compared to the measurement angle $\alpha$ that was determined on the basis of the phase difference $\Delta\varphi$. If the measurement angle $\alpha$ and the reference angle $\beta$ differ from one another, it is possible to calibrate the sensor 3. The phase curve 12 can be adapted accordingly to this end.

Figure 6:
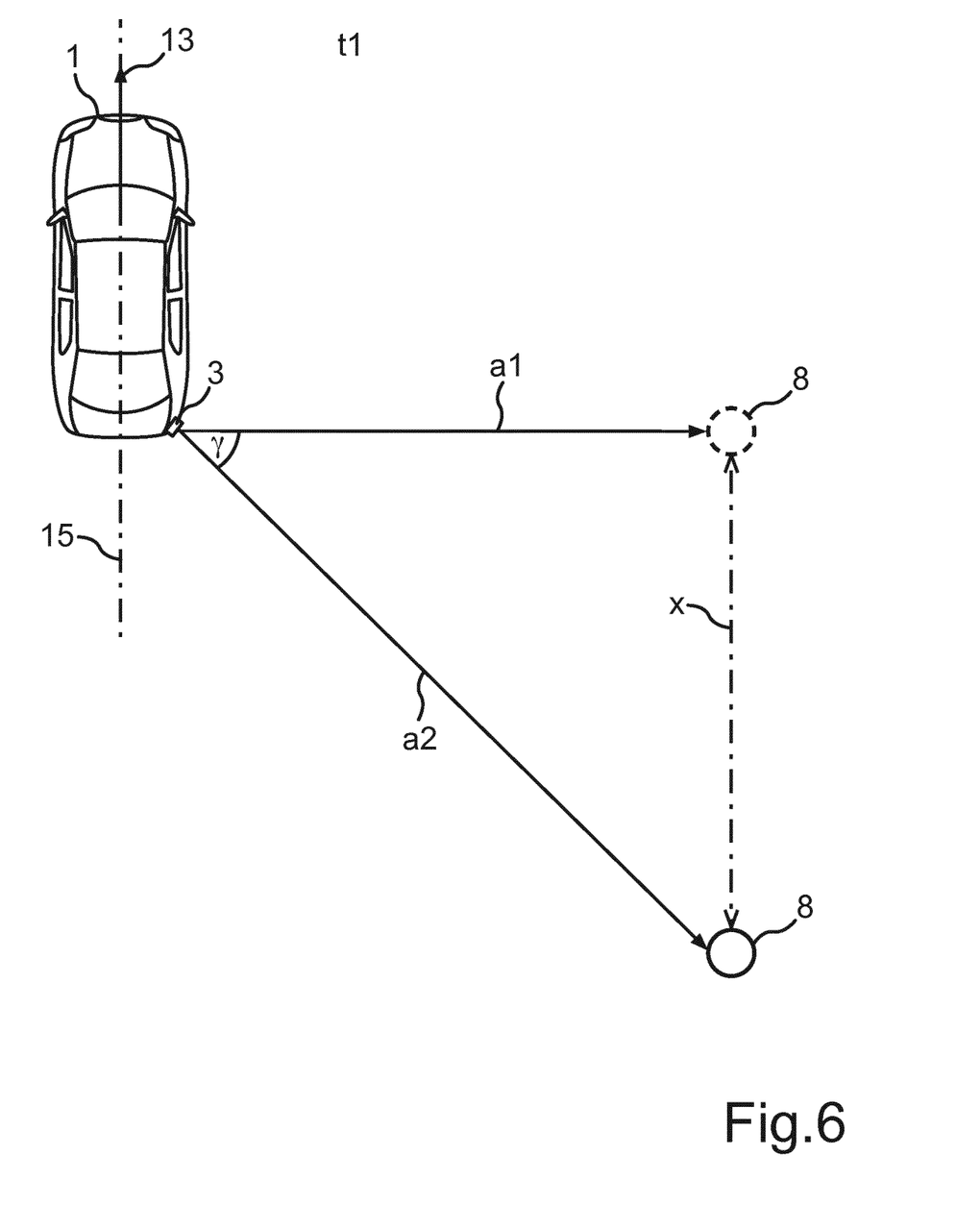
FIG. 6 shows the motor vehicle and the object according to FIG. 4 at a later time.

FIG. 6 shows a motor vehicle 1 according to FIG. 4 at a further time t1 or at a later time. At this further time, the motor vehicle 1 has been moved further past the object 8 along the direction of the arrow 13. An intended angle $\gamma$ between the sensor 3 and the object 8 is determined at this further time t1. To this end, a second distance value a2, which describes the distance between the sensor 3 and the object 8 at the further time t1, is determined. Moreover, use is made of the first distance value a1, which was determined at the reference time t0. In this way, the intended angle $\gamma$ can be determined on the basis of the geometric relationships from the first distance value a1 and the second distance value a2 by means of the computing device 7. The intended angle $\gamma$ can be determined according to the formula below:

$$\gamma = \cos^{-1}(a1/a2).$$

Alternatively, or additionally, it is possible to determine a route value x, which describes the path that the motor vehicle 1 has travelled between the reference time t0 and the further time t1. In particular, this route value x can be determined by means of odometry. In this case, the intended angle γ can be determined on the basis of the first distance value a1 and the route value x:

$$\gamma = \tan^{-1}(x/a1).$$

The measurement angle α can likewise be determined at the further time t1. Here too, the measurement angle, which is determined at the further time t1, can be compared to the intended angle γ. It is possible to correct the phase curve 12 accordingly if a difference emerges here. Here, the method can be carried out for plurality of times in order consequently to be able to appropriately correct the phase curve 12.

The invention claimed is:

1. A method for calibrating a sensor of a motor vehicle, comprising:
while the motor vehicle is moved relative to an object that is not elongated, continuously receiving a reception signal in each case by a computing device from two reception devices of the sensor that are separated by a known distance, said reception signal describing a sensor signal that is emitted by the sensor and reflected at the object;
determining a measurement angle between the sensor and the object on the basis of a phase difference between the reception signals;
continuously determining a relative orientation between the sensor and the object on the basis of the reception signals;
determining a plurality of distance values as a function of time as a time curve by evaluation of the reception signals determined in temporally successive measurement cycles, each distance value describing a distance between the sensor and the object;
determining, by the computing device, a reference time at which the relative orientation corresponds to a predetermined reference orientation for which a reference angle between the sensor and the object is known, the predetermined reference orientation determined in such a way that an imaginary connecting line between the sensor and the object is arranged perpendicular to a longitudinal axis of the motor vehicle, wherein the reference time is determined based on a first distance value that corresponds to a minimum distance value of the time curve of the plurality of distance values as a function of time; and
determining the measurement angle for the reference time and calibrating the sensor on the basis of a comparison between the measurement angle for the reference time and the reference angle.

2. The method according to claim 1, wherein a faulty installation orientation of the sensor is determined on the basis of the comparison between the measurement angle for the reference time and the reference angle and the sensor is calibrated on the basis of the determined, faulty installation orientation.

3. The method according to claim 1, wherein an intended angle between the sensor and the object is determined on the basis of the reference angle for at least one further time, the intended angle is compared to the measurement angle for the at least one further time and the sensor is calibrated on the basis of the comparison between the intended angle and the measurement angle for the at least one further time.

4. The method according to claim 3, wherein the first distance value, which describes the distance between the sensor and the object at the reference time, and a second distance value (a2), which describes the distance between the sensor and the object at the further time, are determined for the purposes of determining the intended angle.

5. The method according to claim 4, wherein a route value, which describes a path travelled by the motor vehicle between the reference time and the further time, is determined for the purposes of determining the intended angle.

6. The method according to claim 1, wherein the measurement angle is determined from the reception signals on the basis of a predetermined phase curve and the phase curve is corrected for the purposes of calibrating the sensor.

7. The method according to claim 1, wherein the object, with respect to which the motor vehicle is moved in relative fashion, is a stationary object or moving object.

8. A computing device for a driver assistance system of a motor vehicle, wherein the computing device performs the method according to claim 1.

9. A driver assistance system comprising at least one radar sensor and a computing device according to claim 8.

10. A motor vehicle having a driver assistance system according to claim 9.

* * * * *